(12) United States Patent
Chintakayala et al.

(10) Patent No.: US 7,664,768 B2
(45) Date of Patent: Feb. 16, 2010

(54) PRESERVING USER CODE IN OTT-GENERATED CLASSES

(75) Inventors: Kalyanji Chintakayala, Bangalore (IN); Subhranshu Banerjee, Bangalore (IN); Krishna Mohan, IV, Bangalore (IN); Srinath Krishnaswamy, Fremont, CA (US); Ravikanth Kasamsetty, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 66 days.

(21) Appl. No.: 12/136,516

(22) Filed: Jun. 10, 2008

(65) Prior Publication Data
US 2008/0275896 A1 Nov. 6, 2008

Related U.S. Application Data

(63) Continuation of application No. 10/899,947, filed on Jul. 26, 2004, now Pat. No. 7,401,088.

(51) Int. Cl.
*G06F 17/30* (2006.01)
*G06F 7/00* (2006.01)
(52) U.S. Cl. .................. 707/101; 707/102; 707/10; 707/104.1
(58) Field of Classification Search .............. 707/101, 707/102, 10, 104.1
See application file for complete search history.

(56) References Cited

U.S. PATENT DOCUMENTS 5,970,490 A * 10/1999 Morgenstern ............ 707/10
6,973,460 B1 * 12/2005 Mitra ................... 707/103 R
2004/0044987 A1 * 3/2004 Kompalli et al. ........... 717/100
2004/0117776 A1 * 6/2004 Pazandak ................ 717/143
2006/0085465 A1 * 4/2006 Nori et al. ................ 707/101

OTHER PUBLICATIONS

Programmer's Guide to the Oracle Pro*C/C++ Precompiler Release 8.0; pp. 1-35, Jun. 1997.

* cited by examiner

*Primary Examiner*—Kuen S Lu
(74) *Attorney, Agent, or Firm*—Townsend and Townsend and Crew LLP

(57) ABSTRACT

An object type translator (OTT) determines one or more database object types. The one or more database object types are mapped to a first structural language type definition code. After being generated, the user may add user code to the first structural language type definition code. During regeneration of these files, the first structural language type definition code is then parsed to determine the user code that has been added, based on the start and end markers that the user code segments have been marked with. OTT maps these user-code segments to the corresponding database types and keeps track of the mapping and the user code. When the OTT starts generating the second structural language code, the OTT determines a position where the user code should be inserted into the second structural language type definition code using that mapping. The user code is then inserted in the second structural language code in the position determined. Accordingly, the user code that was added is not lost when the structural language type definition code is regenerated from the one or more database object types.

17 Claims, 6 Drawing Sheets

PRESERVING USER CODE IN OTT-GENERATED CLASSES

CROSS-REFERENCE TO RELATED APPLICATIONS

This application is a continuation of application Ser. No. 10/899,947, filed Jul. 26, 2004, the content of which is incorporated herein by reference in its entirety.

BACKGROUND OF THE INVENTION

The present invention generally relates to databases and more specifically to an object type translator that preserves user code in structural language type definitions.

An object type translator (OTT) is used to translate database object types to structural language type definitions. For example, the OTT maps database object types to C structs and C++ class definitions. The C structs and C++ class definitions are used by the application developers in the respective host languages.

Typically, OTT for C++ generates the class definitions which have the attributes, basic accessor methods and some methods for internal use by the database interface libraries. In some cases, applications may need some additional attributes and methods for the classes that are meant for use only in the application space and should not to be persistent in the database. (e.g., some static data members, additional constructors/methods, etc.). In such cases, a user may add code in the OTT generated files. When there are changes to the server side object types or when some enhancements happen to the database interface library, the C struct or C++ class definition files need to be regenerated to reflect these changes. Typically, when the OTT is rerun, the files are generated afresh, without preserving the user-added code. Hence, the users had to manually add the code to the generated files every time they are regenerated.

The above process includes many disadvantages. For example, the user must manually add the user code already added to the previously generated files after the files are overwritten. This is inefficient and time is lost in adding the user code that was previously added.

BRIEF SUMMARY OF THE INVENTION

The present invention generally relates to preserving user code in object type translated structural language type definitions. In one embodiment, an object type translator (OTT) determines one or more database object types. The one or more database object types are mapped to a first structural language type definition code. After being generated, the user may add user code to the first structural language type definition code.

During regeneration of these files, the first structural language type definition code is then parsed to determine the user code that has been added, based on the start and end markers that the user code segments have been marked with. OTT maps these user-code segments to the corresponding database types and keeps track of the mapping and the user code. When the OTT starts generating the second structural language code, the OTT determines a position where the user code should be inserted into the second structural language type definition code using that mapping. The user code is then inserted in the second structural language code in the position determined. Accordingly, the user code that was added is not lost when the structural language type definition code is regenerated from the one or more database object types.

In one embodiment, a method for mapping database object types to structural language type definition code is provided. The user code is added to the structural language type definition code for the object types. The method comprises: parsing one or more database object types; re-generating structural language type definition code for the one or more database object types; determining if user code should be inserted in the regenerated structural language type definition code; and if the user code should be inserted, inserting the user code in the regenerated structural language type definition code.

In another embodiment, a method for mapping database object types to structural language type definition code is provided. The method comprises: determining one or more database object types; mapping the one or more database object types to a first structural language type definition code; receiving an input to re-map the one or more database object types; parsing the first structural language type definition code, wherein user code has been added to the first structural language type definition code, to determine the user code that has been added; mapping the one or more database object types to a second structural language type definition code, wherein the mapping comprises: determining a position where user code should be inserted into the second structural language type definition code; and inserting the user code in the second structural language type definition code in the position determined.

Embodiments of the present invention may implemented using an information storage medium having a plurality of instructions adapted to direct an information processing device to perform a set of steps.

A further understanding of the nature and the advantages of the inventions disclosed herein may be realized by reference of the remaining portions of the specification and the attached drawings.

DETAILED DESCRIPTION OF THE INVENTION

Figure 1:
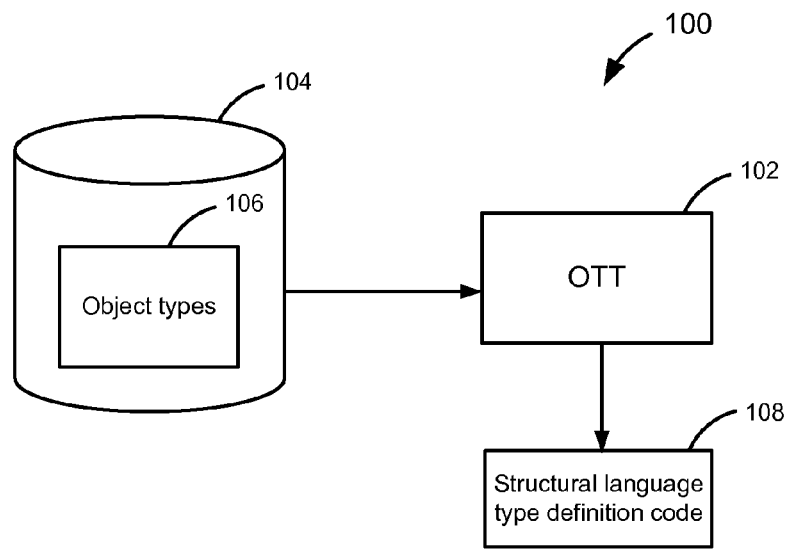
FIG. 1 depicts a system for generating structural language type definition code according to one embodiment of the present invention.

FIG. 1 depicts a system 100 for generating structural language type definition code according to one embodiment of the present invention. System 100 includes an object type translator (OTT) 102 and a database 104. OTT 102 maps object types 106 to structural language type definition code and stores the code in files 108.

Object types 106 may be created and stored in database 104. Object types 106 may be used in the creation of database tables. Object types 106 are well known in the art. It will also be recognized that database items other than object types may be translated. Object types 106 may contain attributes of primitive data types or other object types. An object type may be inherited from another object type.

Once the tables are populated, the objects stored in the table may be accessed. In order to access the data found in object types 106, the object data in object types 106 should be represented in a host language format. This may be accomplished by representing object types 106 as structural language type definitions.

OTT 102 is configured to create the structural language type definitions automatically from object types 106. Structural language type definitions include any software code that may be used to access objects in a database. For example, the software code may be C and C++. The code indicates a structure of the data that is stored for object types 106. For example, structural language type definition code may be C-structs and C++ class definitions. Although C and C++ described, it will be understood that structural language type definition code may be any code that corresponds to object types in a database.

In one embodiment, the structural language type definition code includes a header files and a class files generated by OTT 102. A header files include the data member definitions and prototypes of methods. The class files include the implementation of all the methods. In one embodiment, OTT 102 generates the implementation of the methods in a class file that is separate from the header file. It will be recognized that structural language type definition code may be generated in files other than header and class files. The structural language type definition code is then stored in files 108. As will be described in more detail later, when the structural language type definitions are regenerated from object types 106, files 108 are overwritten by OTT 102.

Figure 2:
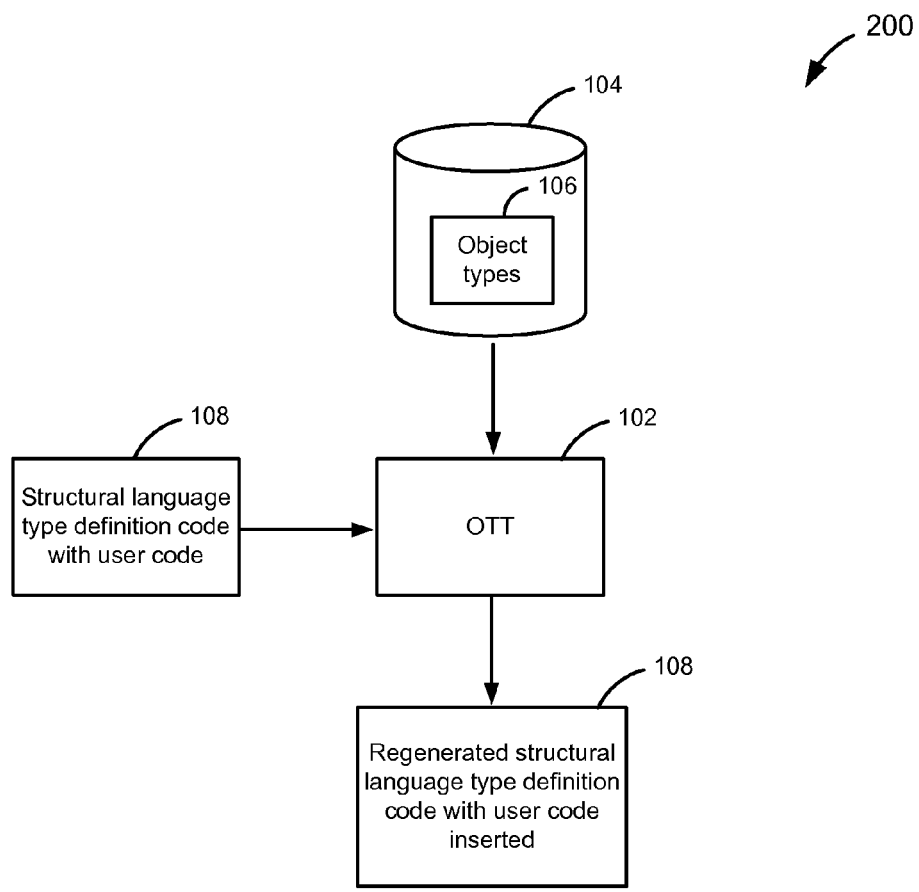
FIG. 2 depicts a simplified block diagram of a system for regenerating structural language type definition code from object types according to one embodiment of the present invention.

FIG. 2 depicts a simplified block diagram of a system 200 for regenerating structural language type definition code from object types 106 according to one embodiment of the present invention. In one embodiment, the structural language type definition code that was generated in FIG. 1 has user code added to it. For example, users may add code to files 108 that include the structural language type definition code. The user may add code because applications may require additional methods and attributes for the classes. When the code is added, the user may use tags to denote where the user code was added. The tags are then used by OTT 102 to determine where user code was added. Although it is described that a user adds the user code, it will be understood that user code is any code that is added to structural language type definition code found in files 108. For example, some static data members, additional constructors/methods, etc. may be added.

OTT 102 parses files 108 with the structural language type definition code to determine the user code. The tags are used to determine the user code. For example, a start tag may indicate the start of user code and an end tag may indicate the end of user code. The process of determining user code will be described in more detail below.

OTT 102 also determines where the user code should be inserted. For example, OTT 102 may determine positioning information that is used to position the user code in regenerated structural language type definition code.

At some point, structural language type definition code may be regenerated. Accordingly, OTT 102 is configured to regenerate structural language type definitions using object types 106. In one embodiment, an input may be received from a user directing OTT 102 to regenerate the structural language type definitions. In one embodiment, OTT 102 is configured to overwrite files 108 with the regenerated structural language type definitions. In one embodiment, files 108 are overwritten because applications are configured to access the files at a specific location and the applications would need to be changed if the regenerated files were stored elsewhere. Because the user code was added to structural language type definition code in files 108 and is not present in object types 106, the regenerated structural language type definition code based on object types 106 does not include the user code.

OTT 102 is configured to insert user code in the regenerated structural language type definition code. OTT 102 may determine that user code was added to files 108 by first determining if files 108 exist for object types 106. Files 108 may exist because object types 106 have already been mapped to structural language type definitions. If files 108 exist, they are parsed to determine if user code has been added to files 108. If user code has been added, OTT 102 then determines positioning information for the user code. The positioning information may indicate the code occurs before a class declaration, in a certain position in top file 108, etc. The user code and positioning information may then be stored.

OTT 102 parses object types 106 and maps them to structural language type definition code as described above. The positioning information is then used by OTT 102 to add the user code to the regenerated structured language type definition code. For example, the positioning information may indicate a position in relation to code in the structural language type definition code. The user code is then inserted in relation to the position. For example, the positioning information may indicate the beginning point of where the user code should be inserted. This process continues as object types 106 are mapped to structural language type definition code. User code is thus inserted as it was inserted in the existing structural language type definition code. It will be understood that the user code may not be inserted in the exact position where the user code was previously inserted in the original structural language type definition code because of changes in the regenerated code. But, it may be approximately inserted in the same position such that the user code functions similarly to the originally inserted user code.

If a position for the user code is not found in the regenerated structural language type definition code, an error may be returned. For example, the positioning information may indicate that user code should be inserted after a class declaration but the class declaration has been deleted in the regenerated structured language type definition code. An error may be returned or OTT 102 may determine a best position to insert the user code.

Accordingly, regenerated structural language type definition code is generated to include the user code added to the previously generated structural language type definition code. The user thus does not need to reinsert the user code. Also, the user code is inserted at a position that corresponds to the position in relation to where the user code is found in the previously generated structural language type definition code.

Figure 3:
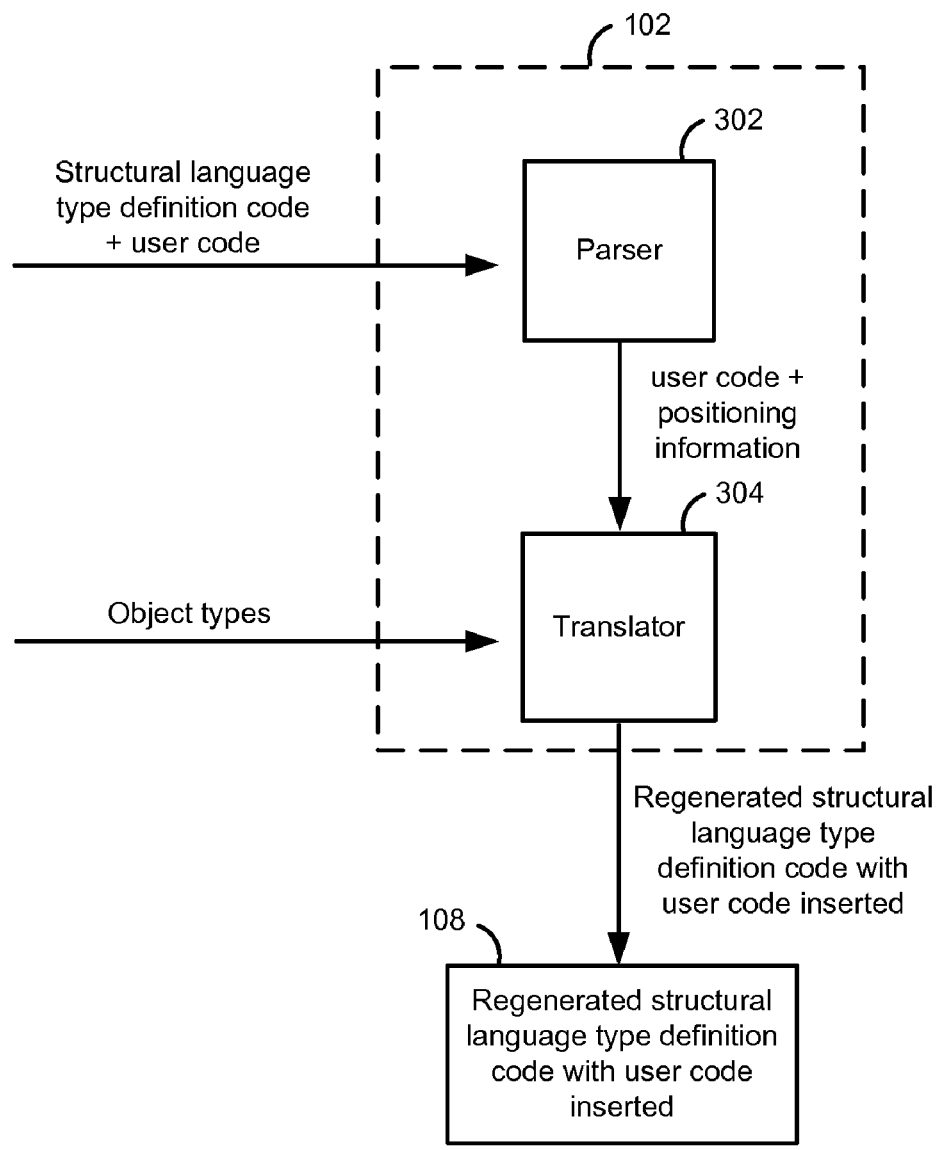
FIG. 3 depicts a simplified block diagram of the OTT according to one embodiment of the present invention.

FIG. 3 depicts a simplified block diagram of OTT 102 according to one embodiment of the present invention. As shown, OTT 102 includes a parser 302 and a translator 304. Parser 302 is configured to receive structural language type definition code and to parse the code to determine user code and positioning information.

Translator 304 is configured to receive object types 106, the user code, and the positioning information. Translator 304 translates object types 106 into structural language type definition code. Also, translator 304 determines where user code should be inserted into the structural language type definition code using the positioning information. Translator 304 then outputs the regenerated structural language type definition code with the inserted user code.

Figure 4:
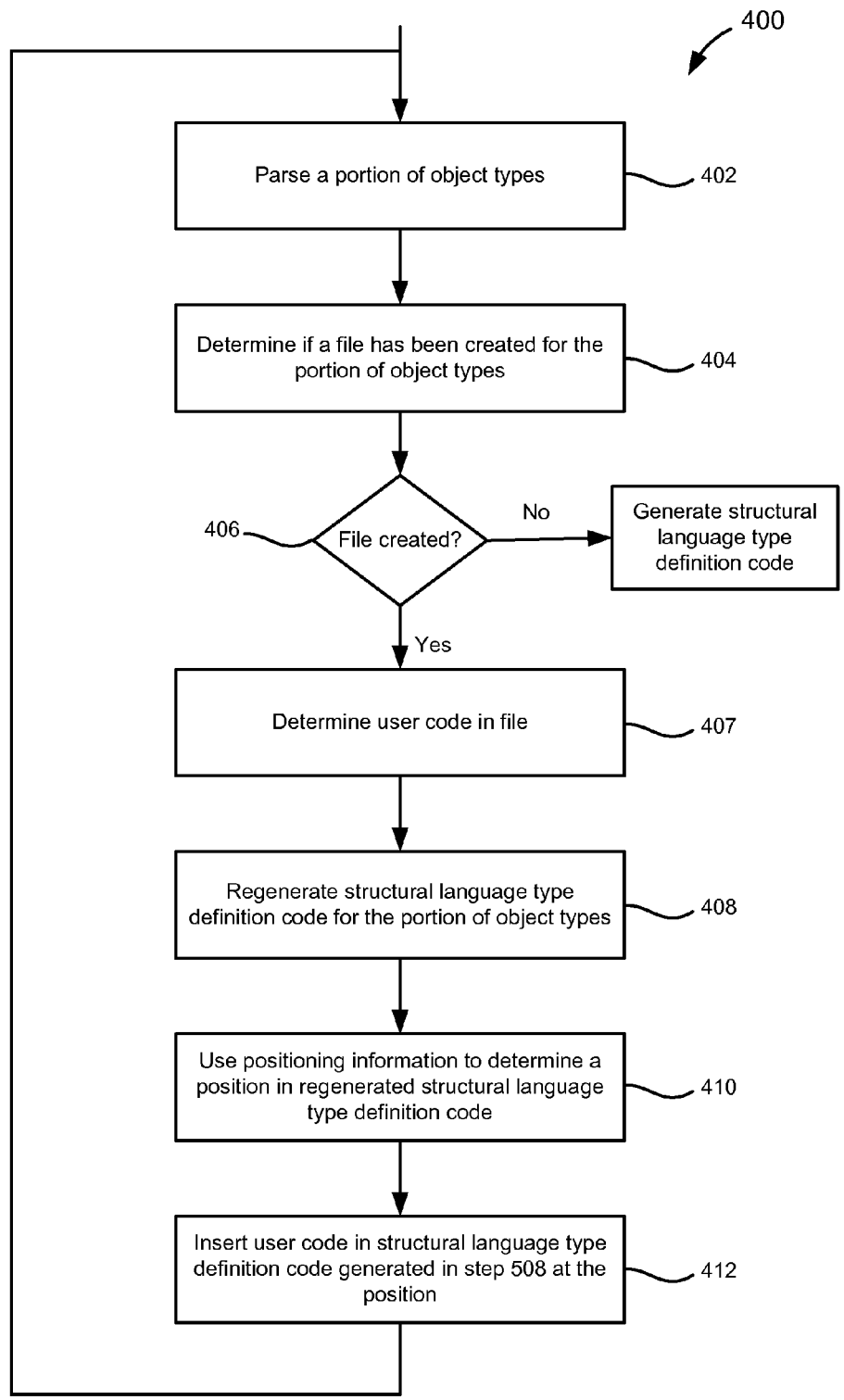
FIG. 4 depicts a simplified flowchart of a method for determining user code in structural language type definition code according to one embodiment of the present invention.

FIG. 4 depicts a simplified flow chart 400 of a method for inserting user code into regenerated structural language type definition code according to one embodiment of the present invention. In step 402, OTT 102 parses a portion of object types 106. The object types 106 may include similar object types 106 as to the ones that were used to generate the existing structural language type definition code.

In step 404, OTT 102 determines if a file 108 has been created for a portion of object types 106. When object types 106 are mapped to structural language type definition code, files 108 are overwritten when the code has already been mapped. Accordingly, OTT 102 determines if files 108 have already been created.

In step 406, if files 108 had not been created, structural language type definition code is generated. The generated code is then stored in newly created files 108.

In step 407, OTT 102 determines user code that was inserted in files 108. It is assumed for discussion purposes that user code was inserted; however, it will be understood that user code may not have been inserted. If user code was not inserted, the structured language type definition code may be regenerated without inserting any user code. The process of determining user code is described in more detail in FIG. 5.

In step 408, OTT 102 generates structural language type definition code for the portion of object types 106.

In step 410, the positioning information is used to determine a portion in the regenerated structured language type definition code in which user code is inserted.

In step 412, the user code is inserted into the structural language type definition code generated in step 508. The user code is inserted in a position determined in step 410. For example, the user code may be inserted after a keyword that was found in the regenerated structural language type definition code. Also, the positioning information may indicate a position where the user code should be inserted. The process may then reiterate to step 502, where the parsing process continues. In this case, as the structural language type definition code is regenerated, user code may be added in the appropriate places.

Figure 5:
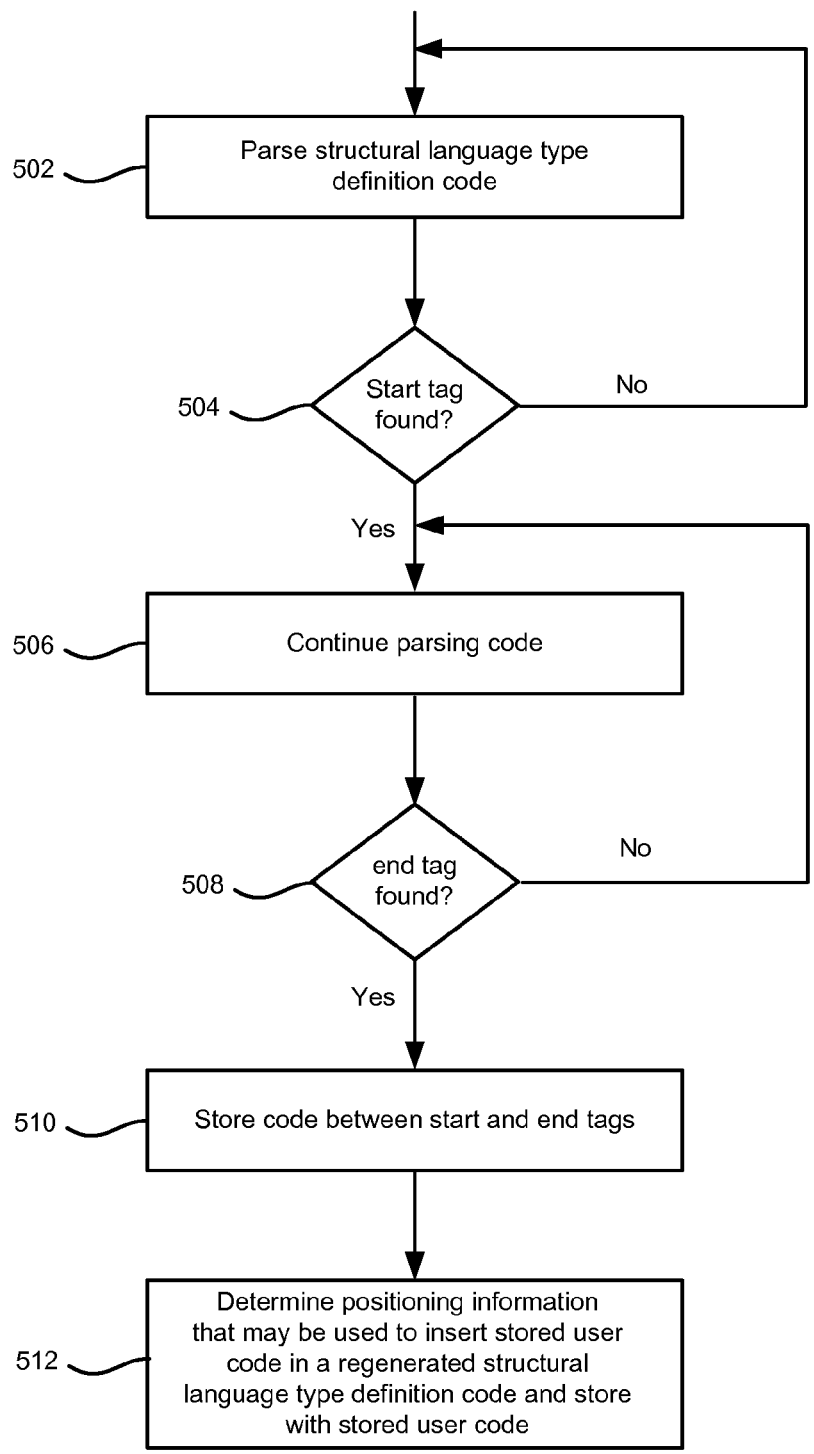
FIG. 5 depicts a simplified flow chart of a method for inserting user code into regenerated structural language type definition code according to one embodiment of the present invention

FIG. 5 depicts a simplified flowchart 500 of a method for determining user code in structural language type definition code according to one embodiment of the present invention. In step 502, OTT 102 parses the structural language type definition code to determine a start tag that may have been inserted by a user. The tag may be any code, symbol, character, etc. that is recognized by OTT 102. The start tag indicates to OTT 102 that user code starts at a certain position. The user code may be found directly after the start tag or at another position related to the start tag. For example, the start tag may disclose a position where the user code starts. The tag may indicate a line number or a key word that indicates the start of the user code.

In step 504, OTT 102 determines if the start tag is found in the structural language type definition code being parsed. If the start tag is not found, the process returns to step 402 where structural language type definition code continues to be parsed. The newly parsed code is monitored for a start tag.

If the start tag is found, in step 506, OTT 102 continues to parse the structural language type definition code.

In step 508, OTT 102 determines if an end tag is found in the parsed structural language type definition code. The end tag indicates the end of the user code. For example, the user code may be all the code found in between the position of the start tag and the position of the end tag. Also, the end tag may indicate a position in the structural language type definition code where the user code ends. For example, the tag may indicate a line number or a key word that indicates the end of the user code.

If the end tag is not found, the process returns to step 506 where OTT 102 continues to parse the structural language type definition code. OTT 102 continues to look for the end tag in the parsed code.

In step 510, when an end tag is found, the user code in between the start and end tags is stored. It will be understood that code other than code found in between the start and end tags may be stored. Also, the start and end tags may indicate a position in the structural language type definition code in which user code is found. That code is then stored.

In step 512, OTT 102 determines positioning information that may be used to insert the stored user code in regenerated structural language type definition code. In one embodiment, OTT 102 determines the positioning information by parsing structural language type definition code around the start and end tags. For example, the OTT 102 may determine a keyword that appears before the start tag. This may be used such that when the keyword appears in any regenerated structural language type definition code, the user code may be inserted after the key word. Additionally, an attribute associated with the structural language type definition code may be used. For example, if a class is "employee" the user code may be inserted before or after code for the class is determined in the regenerated structural language type definition code.

In one embodiment, hints may be provided in object types 106 in case the object types 106 were translated or moved to other object types 106. For example, attributes or classes may be changed in object types 106. The hint may be an old name of a class that may have been changed to a new name of the class. Thus, user code associated with the old name of the class should be inserted with structural language type definition code for the new name of the class. Also, user code may refer to the attributes of the class. If the names of those attributes change, hints may be used to replace the old names in the user code. Thus, OTT 102 may change the user code based on the hints.

In one embodiment, if OTT 102 cannot determine where to insert user code based on the positioning information, the user code may be discarded or an error may be returned. For example, the positioning information may be associated with a class in the structural language type definition code. If the class is not found (possibly because it was deleted from object types 106), then the user code may be discarded or an error may be noted.

Accordingly, embodiments of the present invention enable structural language type definition code to be regenerated with user code inserted. Thus, users may then add code to OTT-generated structural language type definition code and have the code carried forward when the structural language type definition code is regenerated. For example, users may extend classes and add special functions to the structural language type definition code and have the user code be carried forward.

Figure 6:
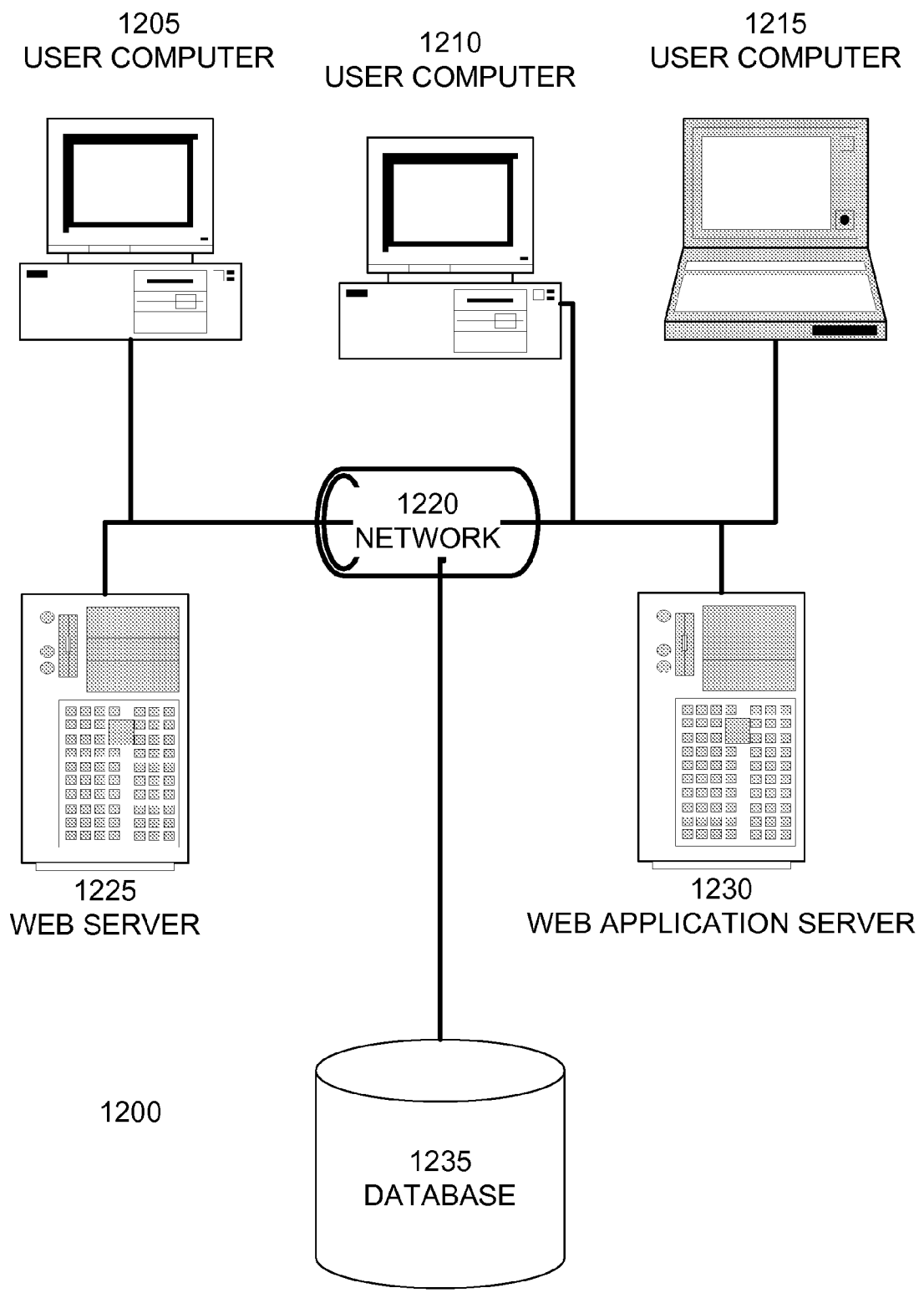
FIG. 6 is a block diagram of a system 1200 that may be used with embodiments of the present invention.

FIG. 6 is a block diagram of a system 1200 that may be used with embodiments of the present invention. System 1200 includes user computers 1205, 1210, and 1220. User computers 1205, 1210, and 1220 can be general purpose personal computers having web browser applications. Alternatively, user computers 1205, 1210, and 1220 can be any other electronic device, such as a thin-client computer, Internet-enabled mobile telephone, or personal digital assistant, capable of displaying and navigating web pages or other types of electronic documents. Although system 1200 is shown with three user computers, any number of user computers can be supported.

A web server 1225 is used to process requests for web pages or other electronic documents from user computers 1205, 1210, and 1220. In an embodiment of the invention, the data analysis software operates within a web browser on a user computer. In this embodiment, all user interaction with the data analysis software is via web pages sent to user computers via the web server 1225.

Web application server 1230 operates the data analysis software. In an embodiment, the web application server 1230 is one or more general purpose computers capable of executing programs or scripts in response to the user computers 1205, 1210 and 1215. The web application can be implemented as one or more scripts or programs written in any programming language, such as Java™ or C++, or any scripting language, such as Perl, Python, or TCL.

In an embodiment, the web application server 1230 dynamically creates web pages for displaying the data analysis software. The web pages created by the web application server 1230 are forwarded to the user computers via web server 1225. Similarly, web server 1225 receives web page requests and input data from the user computers 1205, 1210 and 1220, and forwards the web page requests and input data to web application server 1230.

The data analysis application on web application server 1230 processes input data and user computer requests and can be stored or retrieved data from database 1235. Database 1235 stores data created and used by the enterprise. In an embodiment, the database 1235 is a relational database, such as Oracle 9i, that is adapted to store, update, and retrieve data in response to SQL format commands.

An electronic communication network 1220 enables communication between computers 1205, 1210, and 1215, web server 1225, web application server 1230, and database 1235. In an embodiment, network 1220 may further include any form of electrical or optical communication devices, including wireless and wired networks. Network 1230 may also incorporate one or more local-area networks, such as an Ethernet network; wide-area networks, such as the Internet; and virtual networks, such as a virtual private network.

The system 1200 is one example for executing a data analysis software according to an embodiment of the invention. In another embodiment, web application server 1230, web server 1225, and optionally database 1235 can be combined into a single server computer system. In alternate embodiment, all or a portion of the web application functions may be integrated into an application running on each of the user computers. For example, a Java™ or JavaScript™ application on the user computer is used to retrieve or analyze data and display portions of the data analysis application.

Figure 7:
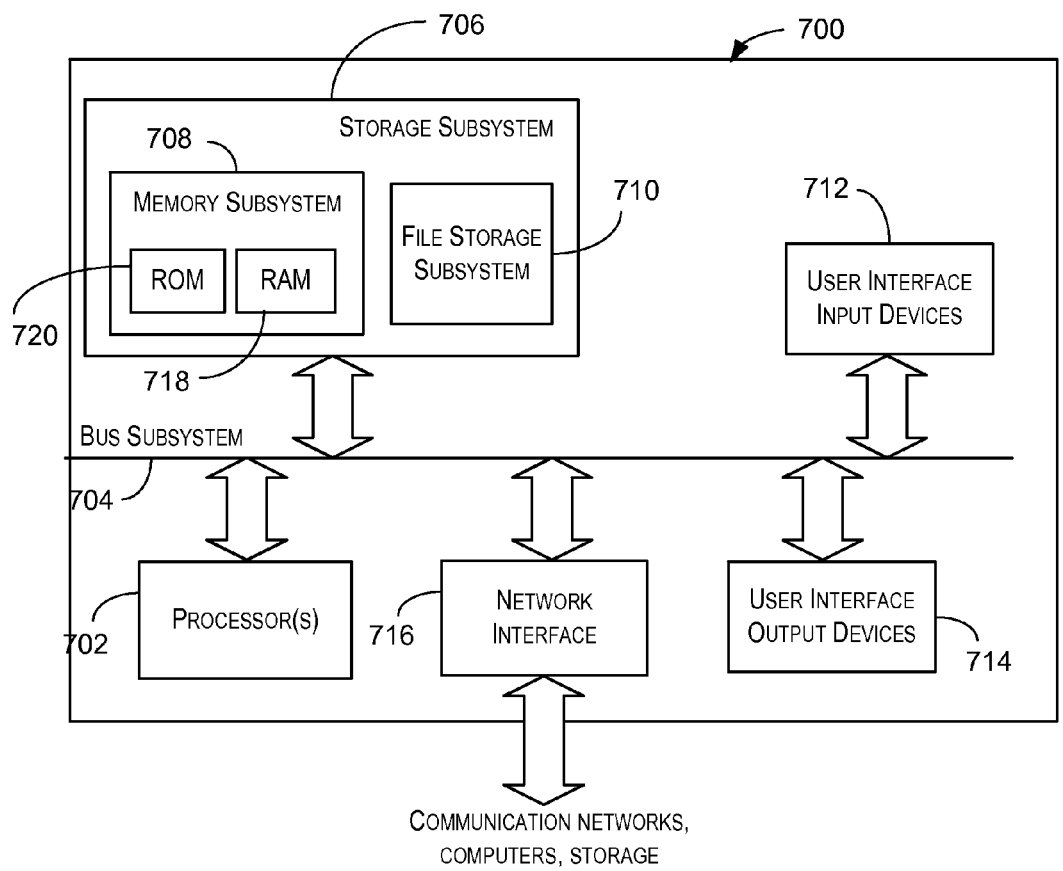
FIG. 7 is a simplified block diagram of a computer system 700 according to an embodiment of the present invention.

FIG. 7 is a simplified block diagram of a computer system 700 according to an embodiment of the present invention. As shown in FIG. 7, computer system 700 includes at least one processor 702, which communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716. The input and output devices allow user interaction with computer system 700. A user may be a human user, a device, a process, another computer, or the like. Network interface subsystem 716 provides an interface to other computer systems and communication networks.

Bus subsystem 704 provides a mechanism for letting the various components and subsystems of computer system 700 communicate with each other as intended. The various subsystems and components of computer system 700 need not be at the same physical location but may be distributed at various locations within a network. Although bus subsystem 704 is shown schematically as a single bus, alternative embodiments of the bus subsystem may utilize multiple busses.

User interface input devices 712 may include a remote control, a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 700.

User interface output devices 714 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include all possible types of devices and ways to output information from computer system 700. According to an embodiment of the present invention, the interface generated according to the teachings of the present invention may be presented to the user via output devices 714.

Storage subsystem 706 may be configured to store the basic programming and data constructs that provide the functionality of the computer system and of the present invention. For example, according to an embodiment of the present invention, software modules implementing the functionality of the present invention may be stored in storage subsystem 706 of OTT 102. These software modules may be executed by processor(s) 702 of OTT 102. In a distributed environment, the software modules may be stored on a plurality of computer systems and executed by processors of the plurality of computer systems. Storage subsystem 706 may also provide a repository for storing various databases that may be used by the present invention. Storage subsystem 706 may comprise memory subsystem 708 and file storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Computer system 700 itself can be of varying types including a personal computer, a portable computer, a workstation, a computer terminal, a network computer, a mainframe, a kiosk, a personal digital assistant (PDA), a communication device such as a cell phone, or any other data processing system. Server computers generally have more storage and processing capacity then client systems. Due to the ever-changing nature of computers and networks, the description of computer system 700 depicted in FIG. 7 is intended only as a specific example for purposes of illustrating the preferred embodiment of the computer system. Many other configurations of a computer system are possible having more or fewer components than the computer system depicted in FIG. 7.

The present invention can be implemented in the form of control logic in software or hardware or a combination of both. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-implemented method for mapping database object types to structural language type definition code, wherein user code is added to the structural language type definition code for the object types, the method comprising:
    parsing one or more database object types with a processor associated with a computer system;
    re-generating structural language type definition code with the processor associated with the computer system for the one or more database object types;
    determining positioning information with the processor associated with the computer system, the positioning information indicating a position in the structural language type definition code of user code in the structural language type definition code;
    determining, with the processor associated with the computer system, the position in the regenerated structural language type definition code based on the positioning information;
    determining, with the processor associated with the computer system, whether user code should be inserted in the regenerated structural language type definition code; and
    based on a determination that the user code should be inserted, inserting the user code in the regenerated structural language type definition code with the processor associated with the computer system, wherein the inserted user code is positioned corresponding to the user code in the structural language type definition code.

2. The method of claim 1, wherein determining positioning information with the processor associated with the computer system comprises parsing the structural language type definition code to determine a start tag.

3. The method of claim 2, wherein determining positioning information with the processor associated with the computer system further comprises parsing the structural language type definition code to determine an end tag.

4. The method of claim 3, further comprising storing user code in a storage device associated with the computer system based on the start and end tag.

5. The method of claim 1, further comprising determining a hint with the processor associated with the computer system, the hint indicating that the user code may be associated with a position in the structural language type definition code for a different object type.

6. The method of claim 1, further comprising determining a hint with the processor associated with the computer system, the hint usable to determine a change to the user code.

7. The method of claim 1, wherein the structural language type definition code comprises an object oriented language.

8. The method of claim 7, wherein the object oriented language is C++.

9. The method of claim 1, wherein the structural language type definition C structs and C++ class definitions.

10. The method of claim 1, wherein the structural declarative language comprises at least one of a header file and class file.

11. An information storage medium having a plurality of instructions adapted to direct an information processing device for mapping database object types to structural language type definition code, wherein user code is added to the structural language type definition code for the object types, the information storage medium comprising:
    code for parsing one or more database object types;
    code for re-generating structural language type definition code for the one or more database object types;
    code for determining positioning information indicating a position in the structural language type definition code of user code in the structural language type definition code;
    code for determining the position in the regenerated structural language type definition code based on the positioning information;
    code for determining whether user code should be inserted in the regenerated structural language type definition code; and
    code for, based on a determination that the user code should be inserted, inserting the user code in the regenerated structural language type definition code, wherein the inserted user code is positioned corresponding to the user code in the structural language type definition code.

12. The information storage medium of claim 11, wherein the code for determining positioning information comprises code for parsing the structural language type definition code to determine a start tag.

13. The information storage medium of claim 12, wherein the code for determining positioning information further comprises code for parsing the structural language type definition code to determine an end tag.

14. The information storage medium of claim 13, further comprising code for storing user code based on the start and end tag.

15. The information storage medium of claim 11, further comprising code for determining a hint indicating that the user code may be associated with a position in the structural language type definition code for a different object type.

16. The information storage medium of claim 11, further comprising code for determining a hint usable to determine a change to the user code.

17. An information processing system for mapping database object types to structural language type definition code, wherein user code is added to the structural language type definition code for the object types, the information processing system comprising:
    a database configured to store information associated with one or more database object types;
    a processor; and
    a memory coupled to the processor and storing program code that when executed by the processor configures the processor to:
        parse the one or more database object types;
        re-generate structural language type definition code for the one or more database object types;
        determine positioning information indicating a position in the structural language type definition code of user code in the structural language type definition code;
        determine the position in the regenerated structural language type definition code based on the positioning information;

determine whether user code should be inserted in the regenerated structural language type definition code; and based on a determination that the user code should be inserted, insert the user code in the regenerated structural language type definition code, wherein the inserted user code is positioned corresponding to the user code in the structural language type definition code.

* * * * *

UNITED STATES PATENT AND TRADEMARK OFFICE
CERTIFICATE OF CORRECTION

| | |
|---|---|
| PATENT NO. | : 7,664,768 B2 |
| APPLICATION NO. | : 12/136516 |
| DATED | : February 16, 2010 |
| INVENTOR(S) | : Kalyanji Chintakayala et al. |

It is certified that error appears in the above-identified patent and that said Letters Patent is hereby corrected as shown below:

In column 1, line 36, delete "every time" and insert -- everytime --, therefor.

In column 2, line 28, delete "may" and insert -- may be --, therefor.

In column 2, line 54, after "invention" insert -- ; --.

In column 3, line 22, before "described" insert -- are --.

In column 7, line 18, delete "Java™" and insert -- Java™, C, --, therefor.

Signed and Sealed this

Thirtieth Day of November, 2010

David J. Kappos
*Director of the United States Patent and Trademark Office*